(12) United States Patent
Nagata (10) Patent No.: US 6,222,974 B1
(45) Date of Patent: Apr. 24, 2001

(54) OPTICAL WAVEGUIDE AND MANUFACTURING METHOD THEREOF

(76) Inventor: Seiichi Nagata, 6-2-1, 7-Chome, Hikaridai, Seika-Cho, Souraku-Gun, Kyoto 619-0237 (JP)

(*) Notice: Subject to any disclaimer, the term of this patent is extended or adjusted under 35 U.S.C. 154(b) by 0 days.

(21) Appl. No.: 09/362,582

(22) Filed: Jul. 28, 1999

(30) Foreign Application Priority Data

Jul. 30, 1998 (JP) ............................................... 10-215155

(51) Int. Cl.[7] .................................................. G02B 6/10
(52) U.S. Cl. ......................................................... 385/129
(58) Field of Search ................................ 385/14, 16, 129, 385/131, 132, 12; 257/184, 458; 359/248, 276, 321; 365/64, 72; 438/211

(56) References Cited

U.S. PATENT DOCUMENTS

| | | | |
|---|---|---|---|
| 4,145,121 | * 3/1979 | Hata et al. | 359/321 |
| 5,280,189 | * 1/1994 | Schuppert et al. | 257/458 |
| 5,757,986 | * 5/1998 | Crampton et al. | 385/2 |
| 5,908,305 | * 6/1999 | Crampton et al. | 438/141 |
| 5,987,196 | * 11/1999 | Noble | 365/64 |

FOREIGN PATENT DOCUMENTS

| | | |
|---|---|---|
| 9-292540 | 11/1997 | (JP). |
| 10-48442 | 2/1998 | (JP). |
| 10-133047 | 5/1998 | (JP). |
| 10-133048 | 5/1998 | (JP). |
| 10-160950 | 6/1998 | (JP). |
| 10-268150 | 10/1998 | (JP). |
| 10-300963 | 11/1998 | (JP). |
| 11-14848 | 1/1999 | (JP). |
| 11-14851 | 1/1999 | (JP). |
| 11-52175 | 2/1999 | (JP). |

OTHER PUBLICATIONS

Applied Physics Letters, "Single-mode optical waveguide fabricated by oxidization of selectivity doped titanium porous silicon" by Seiichi Nagata et al., vol. 72, No. 23, Jun. 8, 1998, pp. 2945–2947.

* cited by examiner

Primary Examiner—Akm E. Ullah
(74) Attorney, Agent, or Firm—Jordan and Hamburg LLP (57) ABSTRACT

An optical waveguide has first dielectric substance region which is formed on a surface of the crystalline silicon substrate, and has second dielectric substance region which is formed outside first dielectric substance region. First dielectric substance region is provided with a region in which a concentration of impurity elements for increasing and/or decreasing a refractive index in a direction of transmitting light is periodically increased and decreased, or provided with a corrugated structure, or wherein its width is periodically changed. Therefore, utilizing the property of thermal equilibrium, the optical waveguide has a grating which is thermally stable even at ordinary temperatures.

3 Claims, 8 Drawing Sheets

OPTICAL WAVEGUIDE AND MANUFACTURING METHOD THEREOF

This application is based on Patent Application No. 10-215155 filed in Japan, the contents of which are hereby incorporated by reference.

BACKGROUND OF THE INVENTION

This invention relates generally to an optical waveguide and a manufacturing method thereof, and more particularly, to an optical waveguide equipped with a grating, and a method of manufacturing said optical waveguide.

The grating in which a refractive index is periodically changed in a light transmitting medium for transmitting light in a confining state, conforms to an optical fiber or an optical waveguide, and has properties of being low loss, miniaturized and the like. Therefore, the grating is applied to various purposes such as a light-reflective device for a laser oscillator, a light-reflective device for a hybrid laser external oscillator combined with a semiconductor, wave separation and integration of optical signal for wavelength multiplexing, equivalent compensation of dispersion of light transmitted in the optical fiber, pulse compressing, equalization of wave length characteristics in a gain of a light amplifier, various sensors for measuring stress or temperature, observation of light-divided tracks, and so on. There are some kinds of gratings, such as a short-period grating in which the refractive index is periodically changed in a period same as the wavelength of the transmitted light, and a long-period grating in which the refractive index is periodically changed in a period longer than the wavelength of the transmitted light.

Further, a chirped grating in which a grating period is changed, is used for a wide band rejection filter, and an apodized grating is used for controlling side band. Thus, these various kinds of gratings including modified gratings have been developed as important optical materials.

Therefore, in addition to the formation of the grating devices in the optical fiber, there has been reported an attempt for miniaturizing and integrating a substrate by forming gratings in the optical waveguide.

Conventional gratings have been applied only to an optical fiber or optical waveguide in which a core containing germanium dioxide ($GeO_2$) as a refractive index increasing element is included in silica ($SiO_2$). That is, intensified light of ultraviolet pulse laser in wavelength from 200 to 300 nano-meters (nm) is applied to the waveguide comprised of the above-mentioned elements, thereby forming the grating by changing the induced refractive index.

However, the application of the ultraviolet radiation takes dozens of minutes, and gives small sensitivity of the changing of the refractive index, so an improvement has been demanded. In order to increase the changing of the refractive index by the application of the ultraviolet radiation, there has been proposed a method of keeping an optical fiber in a high pressure hydrogen atmosphere of hundreds of atmospheric pressure for about a few weeks for adding hydrogen to the fiber, or a method of adding boron (B) or tin (Sn) together with germanium (Ge). Owing to these methods, the sensitivity of changing of the refractive index has been increased.

In order to induce the changing of the refractive index by the application of the ultraviolet radiation, germanium (Ge) elements are essential. It has been considered that the change in the refractive index is caused by change in atomic state of the germanium element by the application of the ultraviolet, radiation. As mentioned above, the application of the ultraviolet radiation changes the refractive index by non-thermal equilibrium, but it gives no change in concentration of a germanium atom which is an impurity for increasing the refractive index in the optical fiber or optical waveguide.

The conventional method for applying the ultraviolet radiation has following problems. First, a pulse laser for applying the ultraviolet radiation takes highly accumulated energy and considerably long time for radiation, which increases its cost. Second, it takes long time to prepare materials and apply the ultraviolet radiation, which makes it difficult to manufacture in volume. Third, materials for forming the fiber or waveguide are limited. Fourth, the change in the refractive index by the application of the ultraviolet radiation is a temporary phenomenon by freezing the non-thermal equilibrium state, so that it may naturally return to its previous state by thermally thawing. In order to decrease change in the property in use at ordinary temperatures, and to secure long term reliability, it is required that a equipment be designed considering an initial property that amount of change in the refractive index after the application of the ultraviolet radiation is deteriorated in dozens of percentages by accelerative aging after forming a grating. For avoiding natural degeneration due to this thermal thawing, there has been proposed a method of using the change in the refractive index in the long-period grating, which is caused by relaxing the residual stress remaining inside the fiber drawn by pre-form combining pure silica core and fluorine dope cladding. However, this method of relieving the stress remaining inside the fiber also contains a problem of utilizing non-thermal equilibrium.

SUMMARY OF THE INVENTION

This invention is made to solve the above-mentioned problems. An object of the present invention is to provide a waveguide grating structure based on a new principle, and a method of manufacturing said waveguide.

In order to achieve the above-mentioned objects, according to one aspect of the present invention, an optical waveguide contains a first dielectric substance region which is provided with a region where a concentration of impurity elements for increasing and/or decreasing a refractive index in a direction of transmitting light is periodically increased and decreased, or provided with a corrugated structure, or wherein its width is periodically changed. Therefore, utilizing the property of thermal equilibrium, the optical waveguide has a grating which is thermally stable even at ordinary temperatures. Besides, required materials are not limited to specific elements, but various kinds of elements can be used, which increases flexibility in designing a device using the waveguide grating.

According to another aspect of the present invention, a method for manufacturing an optical waveguide consists of simple processes, and shortens processing time for manufacturing. Further, the method for manufacturing the optical waveguide according to the present invention eliminates a need of long time application of intensified ultraviolet laser for forming a densified periodic structure, thereby simplifying a formation of densified structure. Thus, this makes it possible to easily integrate a stable grating with waveguide on an optical module substrate, thereby allowing further miniaturization and integration of an apparatus.

DETAILED DESCRIPTION OF THE PREFERRED EMBODIMENT OF THE PRESENT INVENTION

This invention will be described in further detail by way of example with reference to the accompanying drawings.

In an optical waveguide of the present invention, porous silicon is used as intermediate material. Basic characteristics of the porous silicon are determined by porosity (P), pore size (R), and pore size distribution ($\Delta R$). It is noted that the porosity (P) is defined by volume percentages of pores through the whole volume of the porous silicon, the pore size (R) is defined as diameter of pores, and the pore size distribution ($\Delta R$) is defined as the distribution of pore size.

Figure 2:
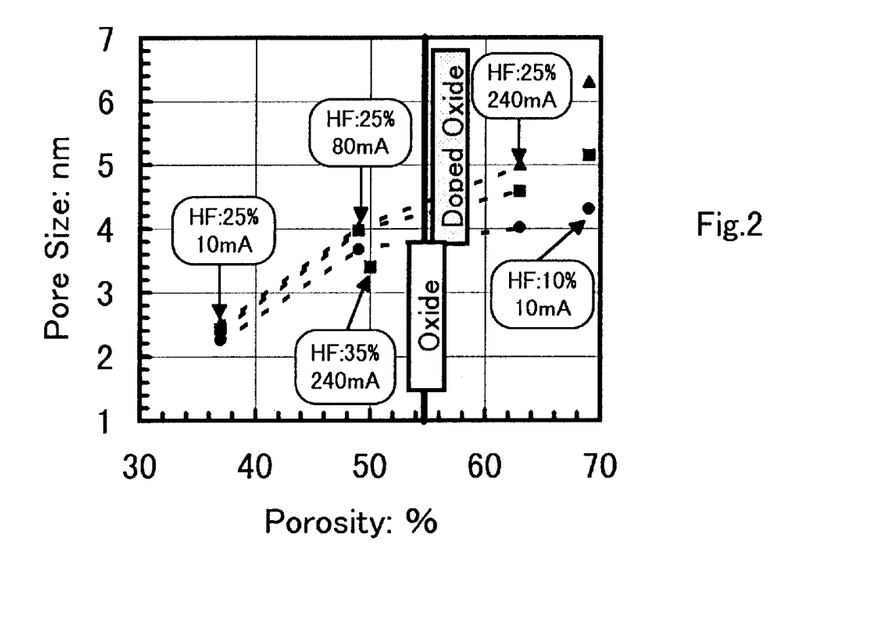
FIG. 2 is a view showing a relationship between properties of the porous silicon and manufacturing conditions.

As to the porous silicon, its porosity (P), pore size (R), and pore size distribution ($\Delta R$) depend on doping characteristics of a silicon substrate to be used, HF (hydrofluoric) acid concentration, and interface current density. In the case of a highly doped p-type silicon substrate, the porosity (P), pore size (R), and pore size distribution ($\Delta R$) are changed as shown in FIG. 2. In FIG. 2, ■ show peak value in the pore size distribution, and ▲ and ● show value of full width at half maximum of the distribution. As to comments in rounded rectangles, upper lines show HF acid concentrations, and lower lines show the interface current densities between porous silicon and crystalline silicon.

The Applicant composed FIG. 2 in a whole surface forming condition for forming uniform porosity in a region of the silicon substrate, based on data reported in the precise study "R. Herino et al., J. Electrochem. Soc. Vol.134, 1994 (1987)" in which a relationship between forming conditions and characteristics of the porous silicon is studied. The figure points out important four properties of the porous silicon. First, the porosity (P) and the pore size (R) increase as the interface current density increases. Second, the porosity (P) and the pore size (R) decrease as the HF acid concentration increases. Third, increasing the HF acid concentration induces a narrowing of the pore size distribution ($\Delta R$). Particularly, using HF acid in a highly concentration induces an extreme narrowing of the pore size distribution ($\Delta R$), and the porosity (P) and pore size (R) become uniform. Fourth, the figure indicates that porous silicon having any desired porosity (P), pore size (R), and pore size distribution ($\Delta R$) can be achieved by choosing the forming conditions of the HF acid concentration and interface current density.

Figure 1:
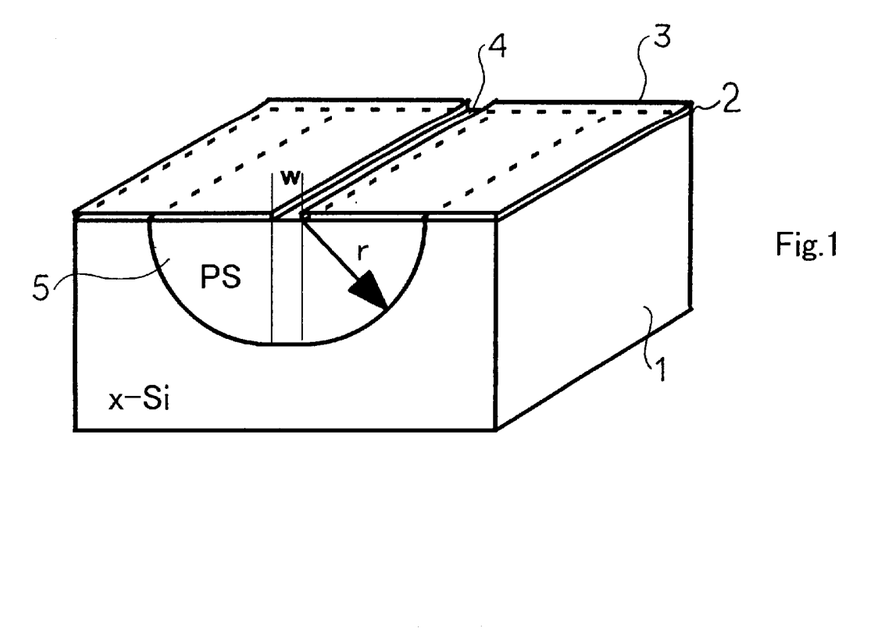
FIG. 1 is a fundamental explanatory view of a general selective formation of porous silicon.

Referring to FIG. 1, a fundamental concept of a forming method of an optical waveguide in accordance with the present invention will be described as follows. The forming method starts with a process of depositing thin-film. mask layer 3 on one surface 2 of a silicon substrate 1, and forming an opening area 4 having a desired width W by a photo-etching method. After that, the substrate 1 is anodically formed in an HF acid solution. When the substrate 1 is highly doped in the p-type, a hole generates equally from the inside of the substrate, and grows a half-round form of radius "r" starting from an end part of the mask, thereby selectively forming a porous silicon region 5. In the porous silicon region 5, porosity (P), pore size (R), and pore size distribution ($\Delta R$) depend on the forming conditions shown in FIG. 2.

In the selective forming shown in FIG. 1, at a certain point in the growing process, length L on a cross section of the interface between the porous silicon 5 and crystalline silicon 1 is given by an equation below:

$$L = \pi r + W \quad (1)$$

It is clear from FIG. 1 that interface current density J between the porous silicon 5 and crystalline silicon 1 is determined by an equation below:

$$J = I/L = I/(\pi r + W) \quad (2)$$

In the above equation, "I" represents current per unit of length which is concentrated into mask opening width W.

If the forming is carried out at constant current I, the interface current density J between the porous silicon 5 and crystalline silicon 1 decreases in accordance with the above equation (2). While the interface current density J is high at an initial stage of the forming in which radius "r" (forming depth from the surface) is small relative to mask opening width W, the interface current density J becomes extremely lower when "r" becomes large relative to mask opening width W (i.e., L>>W).

On the other hand, in order to maintain constant current density on the interface, the equation below should be satisfied:

$$I = J*L \quad (3)$$

That is, it is needed to increase the forming current in proportion to an increase of interface area between the porous silicon 5 and crystalline silicon 1, and to control the forming current as a function of time so as to maintain I=f(t). In the present invention, as described above, it is desired to hold the HF acid concentration and forming current density constant for maintaining constant states of the porosity (P), pore size (R), and pore size distribution ($\Delta R$) in the porous silicon region 5.

Next, a basic process for manufacturing the optical waveguide pertinent to the present invention is shown in FIG. 3. The process starts with a procedure for depositing the mask layer 3 on the one surface 2 of the silicon substrate 1, and forming the opening area 4 having width W by photo-etching (FIG. 3A).

Figure 3A:
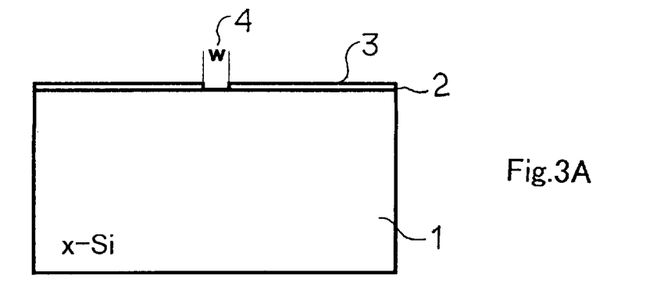
FIGS. 3A, 3B, 3C, 3D, and 3E are views showing fundamental processes for forming an optical waveguide.
Figure 3B:
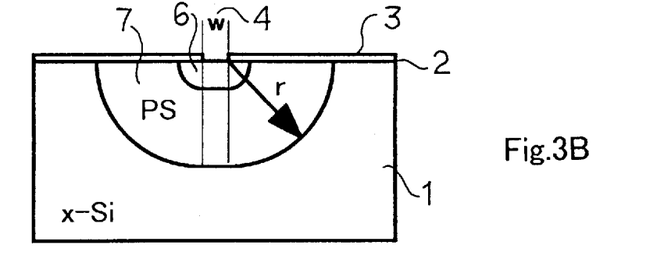

Then, first porous silicon region 6 is formed on the substrate 1 as the anode in a first forming condition, following which, second porous silicon region 7 is formed in a second forming condition (FIG. 3B).

Especially, when an impurity is not doped into the second porous silicon region 7, it is desired that the porosity of the second porous silicon region 7 be designed to be 55%, to minimize the volume change after oxidation. Further, if a highly concentrated impurity of a few percent are doped into the first porous silicon region 6, it is desired that the porosity of the first porous silicon region 6 be maintained to be more than 55% as shown in FIG. 2, in consideration of an effect of the doped impurity to the oxidized volume. Furthermore, regarding the pore size (R), it is desired that pore size (R6) of the first porous silicon region 6 be designed to be larger than pore size (R7) of the second porous silicon region 7. Besides, in connection with "R-imp" (molecular size of an impurity which will be doped into a next procedure), designing a relationship of R6>R-imp>R7 enables selective doping in the next procedure.

Figure 3C:
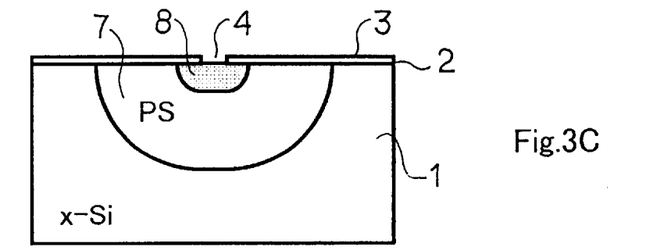

The substrate on which multilayer porous silicon is formed, is immersed into a titanium organic compound solution, after that, the compound solution depositing on the substrate surface is removed. This process dopes impurity molecules into pores of the first porous silicon region 6, and the first porous silicon region 6 becomes a region 8 in which the impurity is doped (FIG. 3C). Since the pore size of the second porous silicon region 7 is smaller than molecular size of the impurity, the impurity cannot be entered into the pores of the second porous silicon region 7. Then, the substrate 1 is oxidized for about an hour for example at 1150° C. in wet oxygen atmosphere.

Figure 3D:
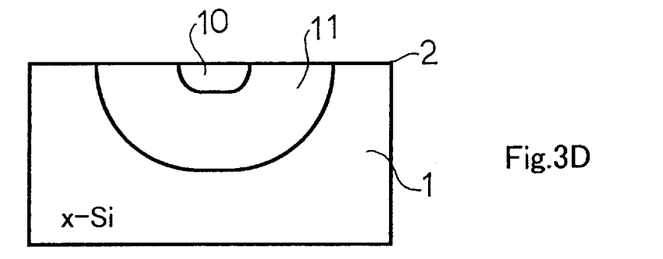
Figure 3E:
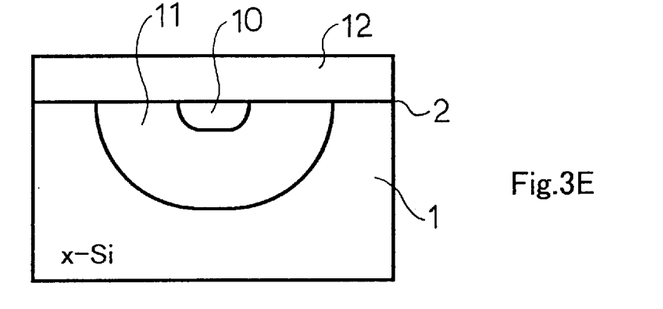

Following the above procedure, the mask layer 3 is removed by etching (FIG. 3D). This oxidation process densifies the first porous silicon region 8 and second porous silicon region 7, and transforms the first porous silicon region 8 in which the impurity was doped, into a core region 10 in which a refractive index is increased by the impurity doping. Also, since the second porous silicon region 7 is oxidized, and no impurity were doped thereinto, this process transforms it into cladding 11 having a lower refractive index. Then, upper cladding layer 12 is formed in response to necessity for completing an optical waveguide (FIG. 3E).

Figure 4:
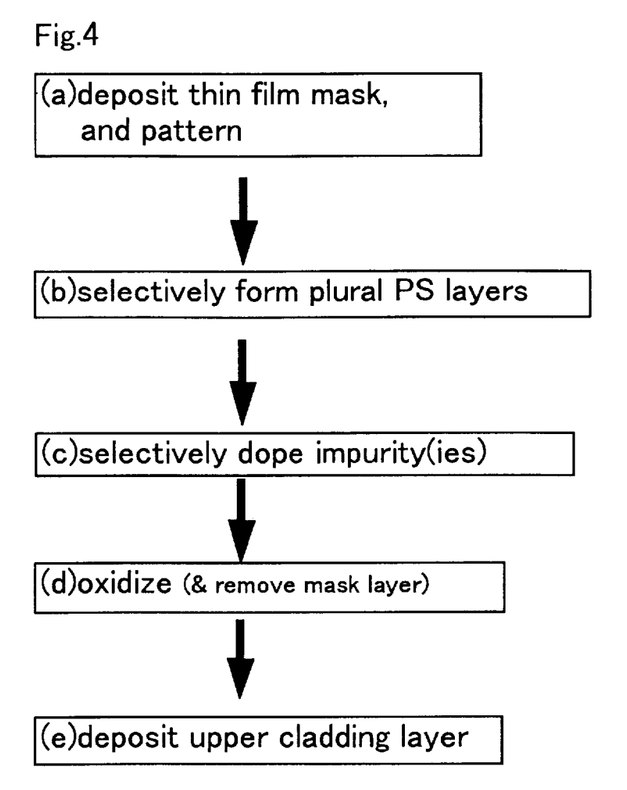
FIG. 4 is a flowchart of a process for manufacturing the optical waveguide.

FIG. 4 shows a basic flow of a manufacturing process of an optical waveguide in an above-mentioned manner. In step (a), a thin film mask is deposited and patterned. In step (b), plural porous silicon layers are selectively formed. In step (c), the impurity is selectively doped. In step (d), the porous silicon regions are oxidized. In step (e), an upper cladding layer is formed.

Figure 5:
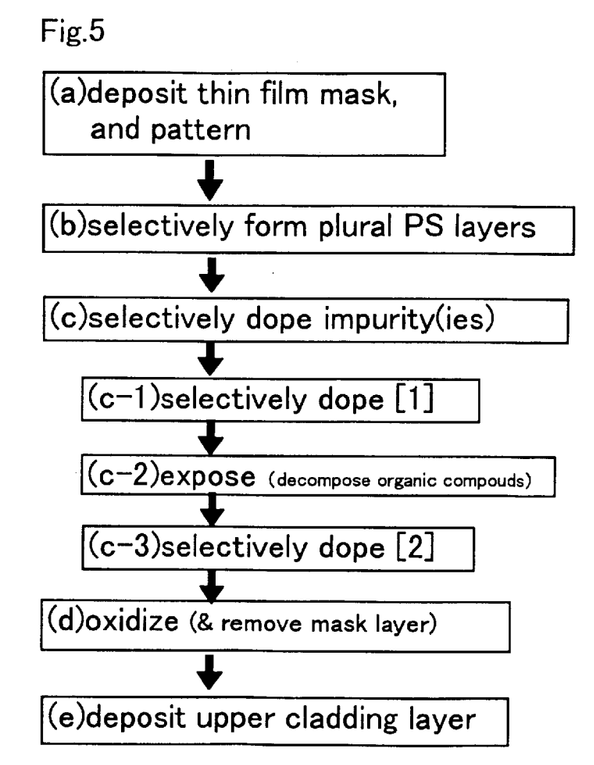
FIG. 5 is a flowchart of a process for manufacturing the optical waveguide according to one embodiment of the present invention.

FIG. 5 shows a method for forming a grating into an optical waveguide. In a flowchart of FIG. 5, steps (a), (b) and (c-1) are the same as steps from (a) to (c) of the flowchart shown in FIG. 4. That is, the silicon substrate in which the impurity was selectively doped (step (c-1)), is heat-treated for example at a temperature about below 200° C. for removing a solvent in which the impurity dissolves (not shown). In this stage, it is important that metal organic molecules remain in the pores of first porous silicon region 8 as organic substances.

Then, the metal organic substances are selectively and periodically decomposed by high intensity of pulse light as an electromagnetic wave (step (c-2)). The light is not limited to ultraviolet radiation, but radiation from infrared to ultraviolet can be used. Also, it is possible to decompose organic elements of the compound by direct absorption of the light into the metal organic molecules, or to decompose the organic elements by momentary heat distribution by absorption of the pulse light into the porous silicon.

Figure 6A:
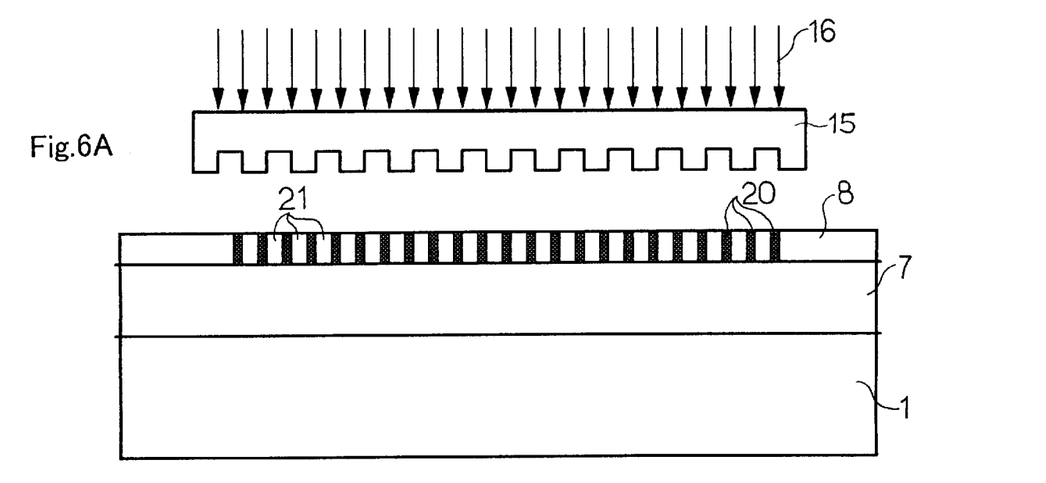
FIGS. 6A, 6B, 6C, and 6D are explanatory views showing manufacturing method of the optical waveguide according to one embodiment of the present invention.
Figure 6B:
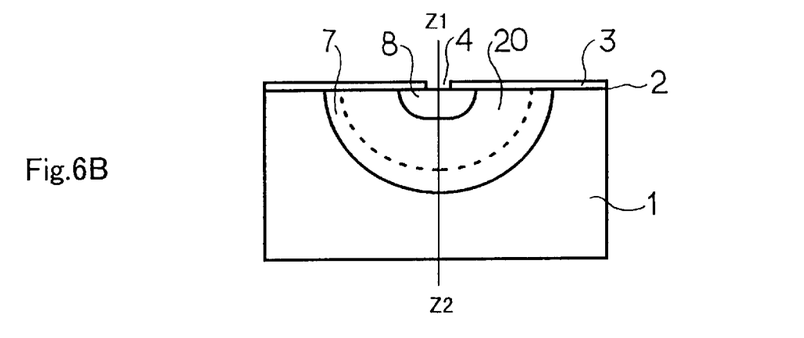

An exposure to the light as mentioned above is shown in FIGS. 6A and 6B. FIG. 6A is a cross sectional view taken on line Z1–Z2 in FIG. 6B, in which the optical waveguide is formed. The surface of the substrate 1 is exposed to pulse light 16 through phase grating 15. The porous silicon region 8 has a region 20 in which the exposure light is intensified by phase coherence. In the region 20 on the porous silicon region 8, the organic elements are decomposed, while, in a region 21 in which the exposure light is weakened, the organic elements remain without decomposed. These are processes in steps from (a) to (c-2) in FIG. 5.

Then, the substrate which has been processed as mentioned above, is again immersed into a solution containing metal organic compound (step (c-3) in FIG. 5). Porous silicon region 8 has the region 20 in which the organic elements are decomposed, and only the metal elements remain in pores in the above process (c-2). Therefore, the pores in the region 20 have spaces for accepting the metal organic compound molecules again. On the other hand, pores in the region 21 in which organic elements remain without decomposed in step (c-2), have smaller spaces for accepting metal organic compound compared to the region 20, since the pores are occupied by the metal organic compound. Consequently, this makes difference in possibility of doping the metal organic compound molecules between the region 20 and the region 21 in step (c-3) in FIG. 5. Thus, this forms regions having a larger amount of the metal impurity and a smaller amount of the metal impurity. After that, organic elements are decomposed out of all the regions of the porous silicon, for example by a heat-treatment at 600° C.

Following the above process, all the regions of the porous silicon are oxidized into silica at about 900° C. in oxygen atmosphere. Then, the silica is densified at about 1100° C. or more in oxidized atmosphere. After that, an upper cladding layer can be formed.

In the above mentioned exposure process, it is required that phase be maintained without light scattering in the porous silicon in order to maintain periodic distribution of light intensity. As described above, the porous silicon used in the present invention has pores of a few nano-meters (nm) in size, and the pore size distribution is considerably small. Wavelength of the applied light is much larger than the pore size (a few nm) of the porous silicon, so light scattering gives little effect. Actually, light is efficiently transmitted for a distance of a few cm or more in the optical waveguide using the porous silicon.

Figure 7:
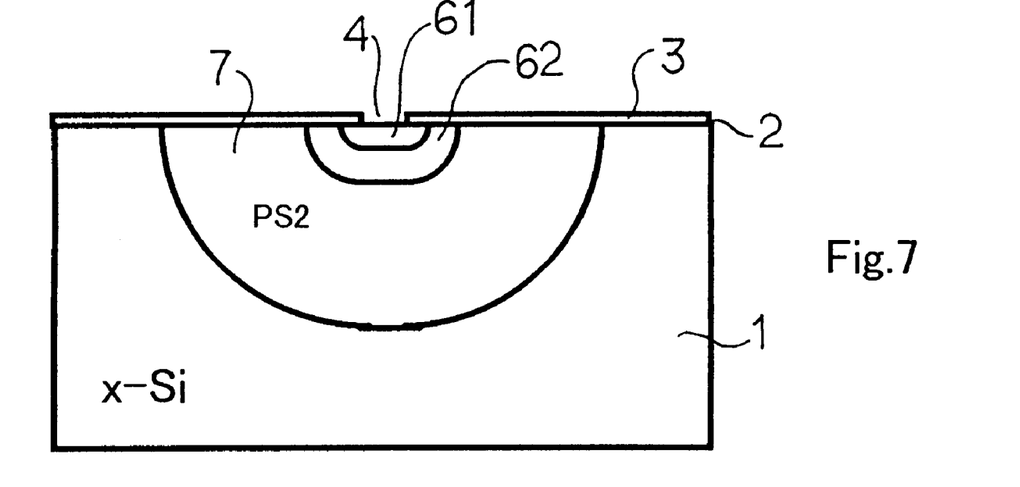
FIG. 7 is an explanatory view for selectively doping impurities having each of properties into partial regions in a core region.

The above second process for doping the impurity forms periodic distribution of impurity metal concentration in the porous silicon region 8. The first and second processes for doping the impurity use metal organic compounds containing metal elements such as: aluminum (Al), boron (B), barium (Ba), bismuth (Bi), calcium (Ca), cadmium (Cd), cerium (Ce), cesium (Cs), dysprosium (Dy), erbium (Er), europium (Eu), gadolinium (Gd), germanium (Ge), hafnium (Hf), holmium (Ho), indium (In), lanthanum (La), lutetium (Lu), magnesium (Mg), niobium (Nb), neodymium (Nd), phosphorus (P), promethium (Pm), praseodymium (Pr), rubidium (Rb), antimony (Sb), samarium (Sm), tin (Sn), strontium (Sr), tantalum (Ta), terbium (Tb), titan (Ti), thallium (Ti), thulium (Tm), yttrium (Y), ytterbium (Yb), tungsten (W), zinc (Zn), zirconium (Zr). Among these metal elements, for example, boron (B) has a property for decreasing a refractive index in silicon dioxide. Further, zirconium (Zr) and titan (Ti) increase a refractive index. Furthermore, rare earth elements such as erbium (Er) which are optically active impurities in silicon dioxide, have a property of light amplification and the like. In the case of the optical waveguide, as to the elements for decreasing the refractive index, it is possible to dope them into both of the first porous silicon region 6 and second porous silicon region 7 shown in FIG. 3. On the other hand, as to the elements for increasing the refractive index, it is desired to selectively dope them only into the first porous silicon region 6. Moreover, it may be required to selectively dope the optically active elements only into a first partial region in the first porous silicon region 6. In such a case, as shown in FIG. 7, it is required to previously form partial regions 61 and 62 in the first porous silicon region 6, wherein pore sizes of the partial region 61 are designed to be larger than those of the partial region 62. Thus, the impurity elements having particular properties (e.g. rare earth elements such as erbium (Er), and the like) can be selectively doped only into partial region 61 by deciding relative sizes between pores and the metal organic compound molecules to be doped.

Regarding an important property of the impurity element to be doped in step (c-3) in FIG. 5, it is required that its diffusion length in heat treatment for densification of porous silica be small in comparison with a grating period, after the oxidation of the porous silicon. The porous silicon is oxidized at about 900° C. for making silicon dioxide (silica). After that, for example, a heat treatment at 1100° C. for an hour is required for densification of porous silica, and for mixing the doped impurity into silica. In this heat treatment, it is also necessary to maintain a periodic distribution of concentration of the impurity elements. That is, it is required that a diffusion length of the impurity elements in silica in the heat treatment for densification of porous silica be small in comparison with a grating period. Advantageously, the diffusion length of boron (B) in silica at a temperature of 1200° C. is about 0.01 $\mu$m per hour, which is small enough compared with the grating period. Thus, there exist various kinds of elements the diffusion length of which is small in silica in the high-temperature heat treatment. Such elements can be chosen out of the previously mentioned metal elements.

Figure 6C:
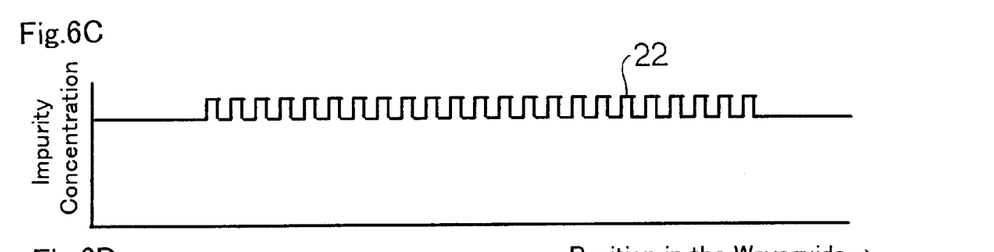
Figure 6D:
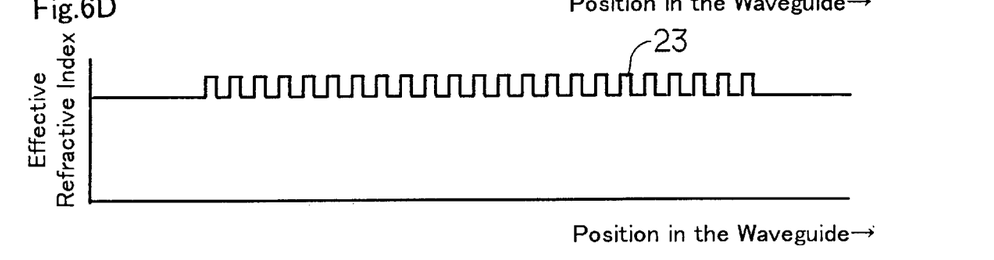

As shown in FIG. 6C, choosing impurity elements the diffusion length of which is smaller than the grating period in the heat-treatment, makes impurity concentration 22 periodically change according to a position of the waveguide. Depending on the impurity concentration, a refractive index 23 periodically changes as shown in FIG. 6D, thereby forming a grating in a desired position in the waveguide.

Concerning the impurity which is doped in step (c-1) in FIG. 5B, for increasing the refractive index, the relationship between its diffusion length and period is not so important. It is the impurity to be doped in step (c-3) the diffusion length of which is required to be small compared with the period. Although FIG. 5 shows an example that the impurity for increasing the refractive index is doped in step (c-3) for doping an impurity [2], it is also possible to dope the impurity which decreases the refractive index for making a periodic structure in the refractive index.

In step (c-1) for selectively doping the impurity [1] in FIG. 5, it is also possible to selectively dope multiple kinds of elements at the same time. If metal organic compound molecules consisting of elements having a property for decreasing the refractive index are decreased in size, if metal organic compound molecules consisting of elements having a property for increasing the refractive index are increased in size, and if metal organic compound molecules consisting of elements such as optically active rare earth are further increased in size, the selective doping is achieved in response to the pore size of each of porous silicon regions. For example, in FIG. 7, it is possible to dope only the impurity for decreasing the refractive index into the second porous silicon region 7, and to dope both of the impurities for decreasing and increasing the refractive index into the partial region 62, and to dope optically active rare earth into the partial region 61 in addition to the impurities for decreasing and increasing the refractive index. In this process, changing the size of the metal organic compound molecules to be doped having various sizes is allowed by prior arts as an object for designing metal organic compound molecules. Therefore, choosing combination between pore size and molecular size makes it possible to selectively dope the elements having various properties.

When the impurity having a property for decreasing the refractive index is selectively doped only into the region 20 in which coherent light is intensified in the region 8 of FIG. 6 in step (c-3) of FIG. 5, the metal organic compound molecular size and effective pore size for doping should be controlled such that the metal organic compound molecules containing the elements can be doped into the region 20, but not be doped into the regions 21 and 7.

Figure 8:
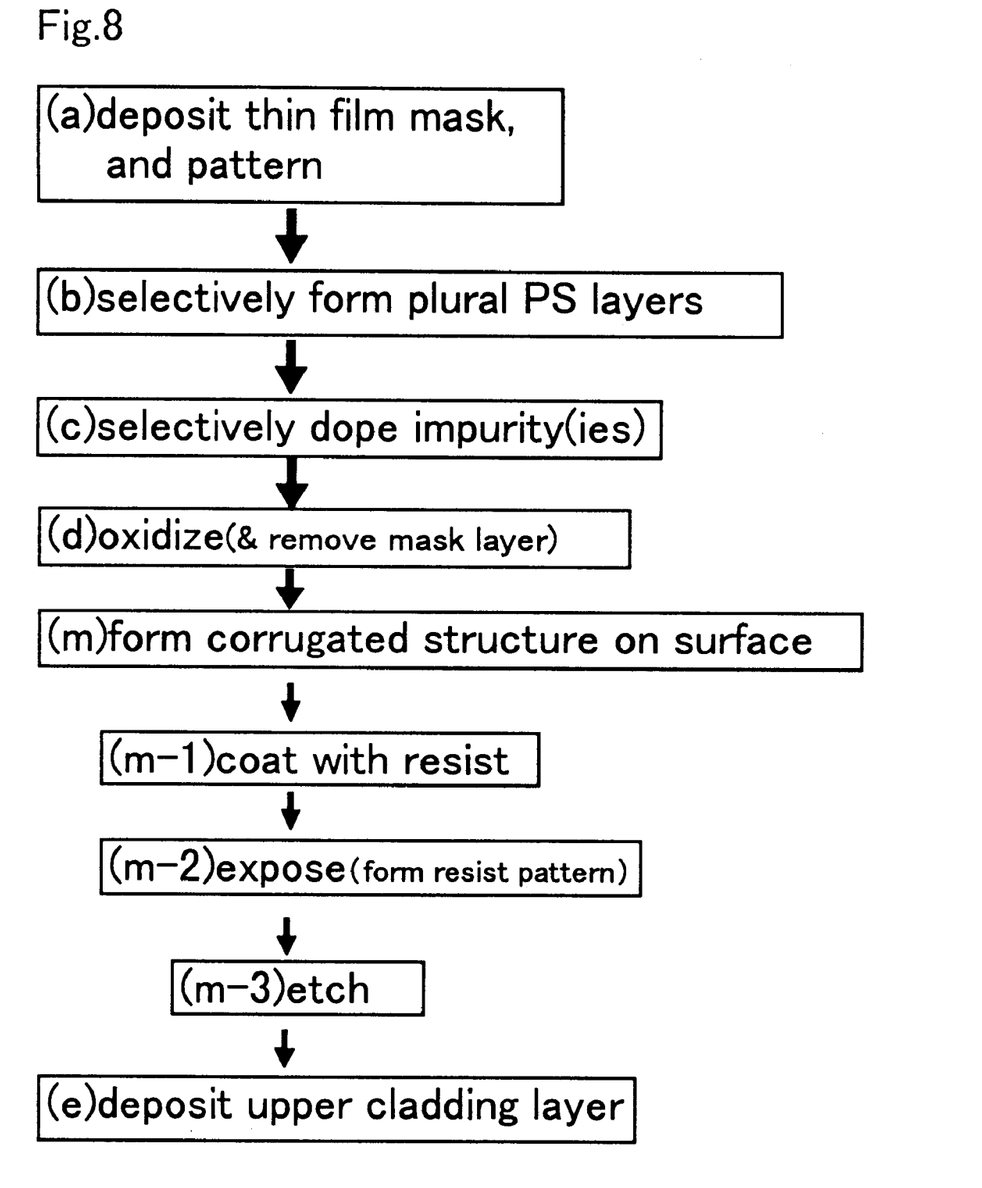
FIG. 8 is a flowchart of a process for manufacturing the optical waveguide according to one embodiment of the present invention.
Figure 9A:
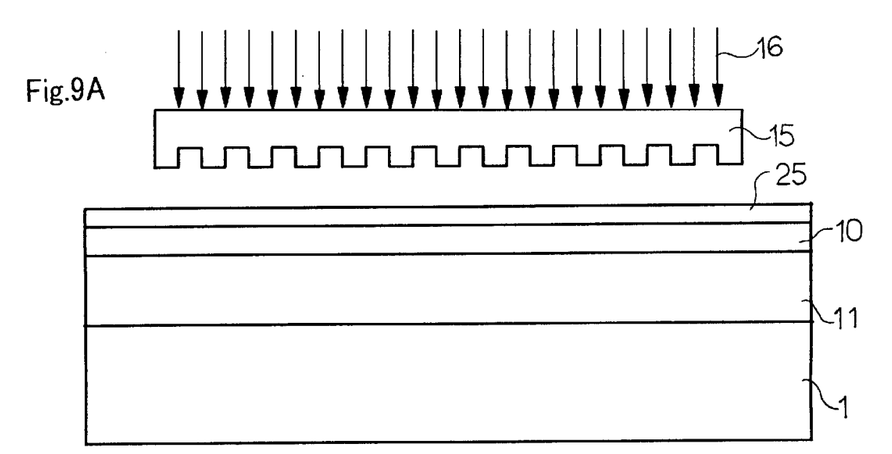
FIGS. 9A, 9B, 9C, and 9D are explanatory views showing manufacturing method of the optical waveguide according to one embodiment of the present invention.

Next, referring to FIG. 8, a manufacturing method of the optical waveguide is explained. In a flowchart of FIG. 8, steps from (a) to (d) are same as those of FIG. 4. Following the processes for an oxidation, and densification of the porous silicon, the procedure goes to a conventional process for applying a coating of resist 25 to the surface of the substrate from which mask layer 3 is removed (step (m-1) in FIG. 8). Then, as shown in FIG. 9A, the resist 25 is exposed to light 16 through the phase grating 15. After development of an exposure pattern (step (m-2) in FIG. 8), the surface of the waveguide is etched by a common method (step (m-3) in FIG. 8) and the like. This process forms corrugated structure 26 on the waveguide surface as shown in FIG. 9C. The corrugated structure 26 on the surface effectively modulates the refractive index of the waveguide. Consequently, this forms a grating waveguide in which an effective refractive index 27 periodically changes depending on the position of the waveguide as shown in FIG. 9D.

Figure 9B:
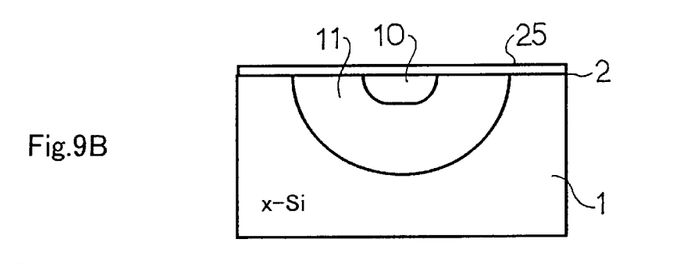
Figure 9C:
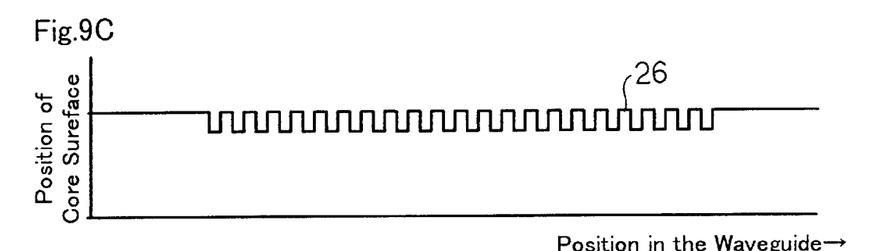
Figure 9D:
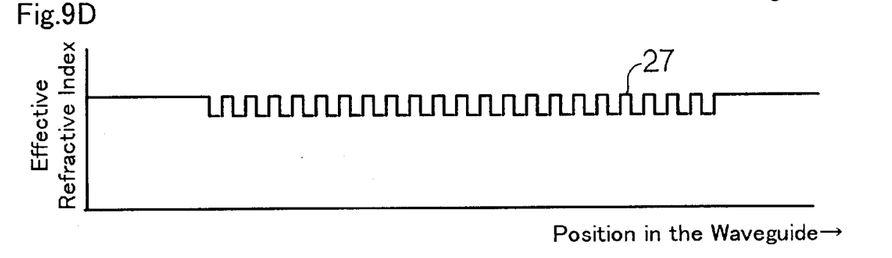

In this method, as shown in FIG. 9B, surfaces of a core region 10, and the lower cladding 11 are in the same plane as the one surface 2 of the silicon substrate 1. Therefore, the resist can coat the plane having no roughness, so that thin resist can be treated in uniform thickness, which allows micro processing accurately.

The above embodiment can be applied to both of short-period grating and long-period grating, wherein a refractive index changing period of the short-period grating is almost same as wavelength of light transmitted in the waveguide, and a refractive index changing period of the long-period grating is enough longer than the wavelength.

Figure 10A:
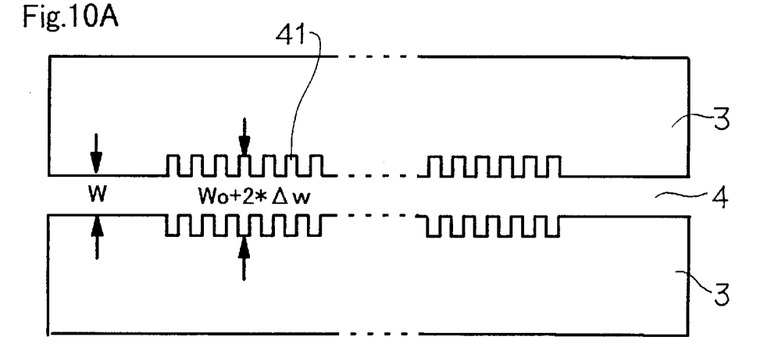
FIGS. 10A, 10B, and 10C are explanatory views for manufacturing the optical waveguide according to one embodiment of the present invention.
Figure 10B:
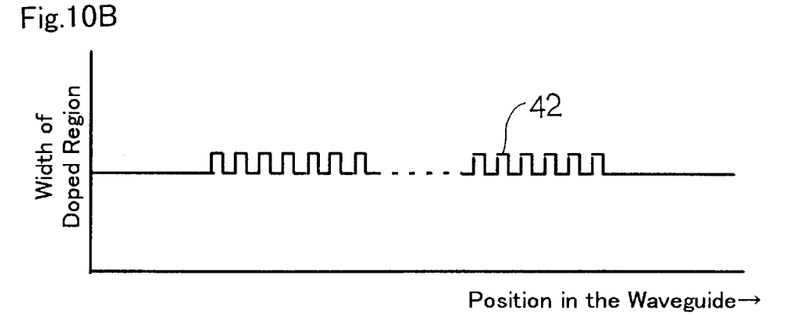
Figure 10C:
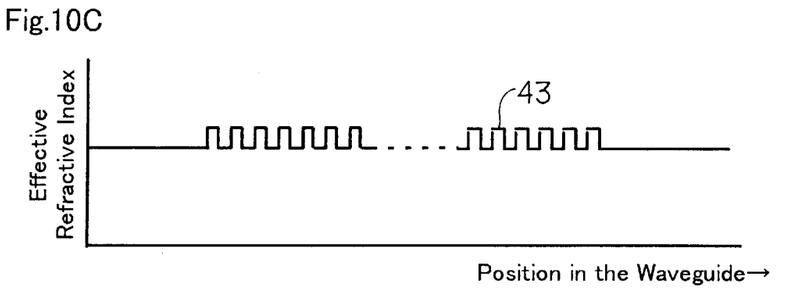

Referring now to FIGS. 10A–10C, an optical waveguide and a manufacturing method thereof are described. In the process of patterning the mask layer 3 in FIG. 4, a corrugated structure 41 having periodic width $\Delta W$ is formed on the opening area 4 having width W as shown in FIG. 10A. Processing the substrate on which the mask pattern is formed according to the flowchart of FIG. 4, enables to integrate long-period grating in the waveguide.

For example, the above-mentioned $\Delta W$ has an effect for modulating the first porous silicon region 6 and second porous silicon region 7 (FIG. 3) in width, which consequently modulates the core region 10 and lower cladding 11 in width. That is, this modulates width 42 of the highly doped region as shown in FIG. 10B. Therefore, a desired corrugated structure can be formed in an effective refractive index distribution 43 as shown in FIG. 10C.

The above-described grating periodic structure is formed by changing concentration distribution of the impurity or changing regions of the impurity distribution in detail. This structure does not use non-thermal equilibrium, but uses a property of thermal equilibrium, so that, the characteristics are stable at ordinary temperatures. Therefore, if a tunable waveguide grating filter is constructed by using the waveguide grating of the present invention, and for example, using thermal dependence of intercepted wavelength by local heating in a grating part by a micro heater, there generates no problem in its reliability and characteristic stability for the long term.

The present invention is not limited to the above-described embodiment, but includes varied or modified embodiments from the above. Although the above embodiment shows a simple periodic structure as an example, it is also possible to make variations in response to its purpose, such as chirped structure in which a period is continuously changed, apodized structure in which a weight is superimposed on a period, and a phase shift grating in which phase of a periodic structure is changed.

What is claimed is:

1. A method of manufacturing an optical waveguide comprising:
    a step of depositing a mask layer on a surface of a crystalline silicon substrate, thereafter removing a part of said mask layer;
    a step of forming a first porous silicon region in said crystalline silicon substrate, starting from a part from which said mask layer is removed;
    a step of forming a second porous silicon region having smaller pores than pores of the first porous silicon region, in outside part of the first porous silicon region;
    a step of a first doping of impurity elements into said first porous silicon region and/or said second porous silicon region;
    a step of applying electromagnetic wave intensity of which periodically changes, into a part of said first porous silicon region and/or said second porous silicon region;
    a step of a second doping of impurity elements into said first porous silicon region and/or said second porous silicon region; and,
    a step of oxidizing said first porous silicon region and said second porous silicon region.

2. A method of manufacturing an optical waveguide comprising:
    a step of depositing a mask layer on a surface of a crystalline silicon substrate, thereafter removing a part of said mask layer;
    a step of forming a first porous silicon region in said crystalline silicon substrate, starting from a part from which said mask layer is removed;
    a step of forming a second porous silicon region having smaller pores than pores of the first porous silicon region, in outside part of the first porous silicon region;
    a step of doping impurity elements into said first porous silicon region and/or said second porous silicon region;
    a step of oxidizing said first porous silicon region and said second porous silicon region; and,
    a step of forming a corrugated structure on a surface of said oxidized first porous silicon region.

3. A method of manufacturing an optical waveguide comprising:
    a step of depositing a mask layer on a surface of a crystalline silicon substrate, thereafter removing said mask layer having a part width of which is periodically changed;
    a step of forming a first porous silicon region in said crystalline silicon substrate, starting from a part from which said mask layer is removed;
    a step of forming a second porous silicon region having smaller pores than pores of the first porous silicon region, in outside part of the first porous silicon region;
    a step of doping impurity elements into said first porous silicon region and/or said second porous silicon region; and,
    a step of oxidizing said first porous silicon region and said second porous silicon region.

* * * * *